Aug. 10, 1965  J. T. BROWN ETAL  3,199,978
HIGH-STRENGTH, PRECIPITATION HARDENING AUSTENITIC ALLOYS
Filed Jan. 31, 1963  4 Sheets-Sheet 1

WITNESSES
Robert C Baird
James F. Young

INVENTORS
Jack T. Brown, Albert W. Hoppe
& Donald W. Gunther.
BY
Frederick Shopor
ATTORNEY

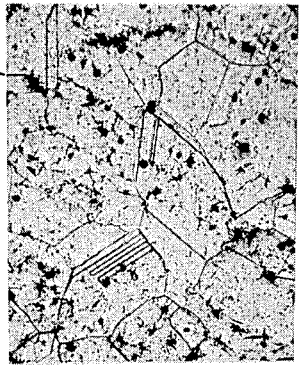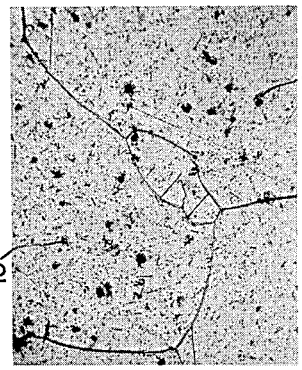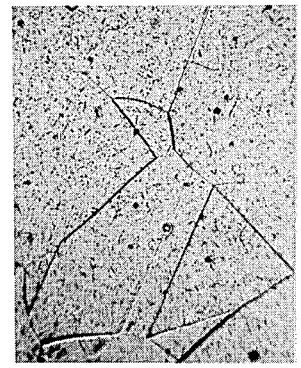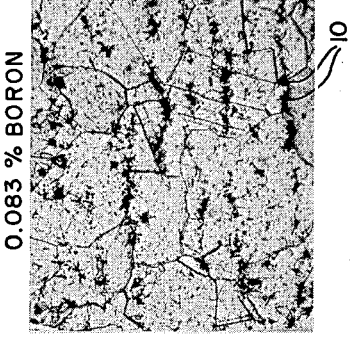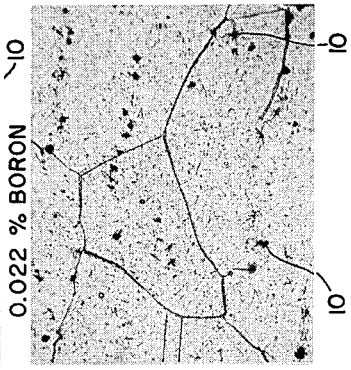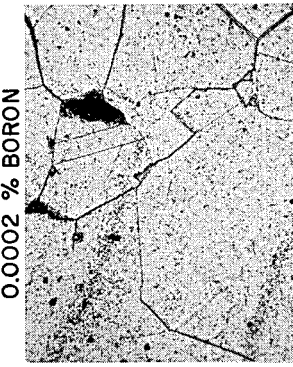

United States Patent Office 3,199,978
Patented Aug. 10, 1965

3,199,978
HIGH-STRENGTH, PRECIPITATION HARDENING AUSTENITIC ALLOYS
Jack T. Brown, Monroeville, Albert W. Hoppe, Canonsburg, and Donald W. Gunther, Monroeville, Pa., assignors to Westinghouse Electric Corporation, Pittsburgh, Pa., a corporation of Pennsylvania
Filed Jan. 31, 1963, Ser. No. 261,925
12 Claims. (Cl. 75—128)

This application is a continuation-in-part of application Serial No. 610,522, filed September 18, 1956, now abandoned.

This invention relates to precipitation hardenable austenitic alloys of iron, nickel, chromium, titanium and molybdenum, embodying boron.

For many applications it is desirable to employ austenitic alloys having high strength with high ductility at elevated temperatures of the order of 1100° F. to 1300° F. Such alloys should contain a minimum amount of expensive or difficultly obtainable alloying ingredients, such as cobalt and tungsten. The alloys should possess good mechanical properties such as high stress-rupture strength, fatigue strength and notch ductility. Austenitic alloys with the highest strengths for any given temperature while being notch insensitive are particularly desirable for rotor discs and other rotating components of jet engines. Bolts, sheets, and other mechanical elements employed in high temperature apparatus may be prepared from such alloys. The alloys should possess resistance to scaling and oxidation at temperatures above 1100° F.

It is particularly desirable that the high temperature, high strength austenitic alloys be readily prepared by conventional metallurgical apparatus and techniques in small and large ingots with good results being secured regardless of the ingot size. In particular, the alloy should be readily wrought, as by forging with conventional metal working apparatus with the minimum of departure from normal procedures.

Austenitic alloys of iron, nickel, chromium and molybdenum have been prepared heretofore with precipitation hardening components such as titanium and aluminum in carefully selected amounts. Titanium in particular has proven to be an outstanding precipitation hardening component for such alloys. However, the use of titanium in amounts in excess of approximately 2% to 2.5%, while increasing the hardness and strength of the alloys, usually results in a drastic reduction in ductility and an increase in notch sensitivity. It has been found that the addition of small but critical amounts of boron to the titanium hardened alloys of iron, nickel, chromium and molybdenum significantly increases the ductility of the alloys so that much higher proportions of titanium may be added to obtain a higher strength while retaining adequate ductility and notch insensitivity.

Evidence has been obtained which indicates that in the areas near grain boundaries there appears to be a deficiency of titanium hardening compounds after the alloys have been precipitation hardened, as compared to areas further removed from the grain boundaries. In the grain boundaries themselves titanium compounds are present in excessive amounts, consequently imparting high hardness and low ductility to the boundary layers. It is believed that the titanium compounds rapidly diffuse or migrate from nearby areas into the grain boundaries to cause this result. These localized large concentration gradients of the hardening compounds at and near the grain boundaries lead to a deleterious ductility and notch sensitivity condition.

The atoms of iron, nickel, chromium, cobalt and manganese have nearly the same size and consequently they are mutually substitutional type atoms such that in any alloy comprising these elements they can mutually replace one another on the crystal lattice sites. The atoms of carbon, nitrogen and oxygen are much smaller and function as interstitial elements in alloys wherein the first group of atoms are present. The interstitial atoms ordinarily do not occupy crystal lattice sites but rather locate themselves in the interstices of the crystal lattice. Irregularities or imperfections occurring between crystals at the grain boundaries comprise many random spaces or vacancies of such sizes that neither the substitutional atoms nor the interstitial atoms will occupy them readily.

Grain boundary vacancies are locations wherein precipitation reactions may be nucleated most rapidly from the solid solution. Such nucleation reaction takes place at the grain boundary vacancies as the result of the energy conditions present at such places. A substantial proportion of the grain boundary vacancies can be filled with atoms of a size intermediate between the substitutional and the interstitial atoms and, when filled, the vacancies would no longer be effective as precipitation initiating sites.

It has been discovered that boron atoms, which are approximately three-quarters the size of iron atoms, will enter into a great number of such boundary spaces in alloys comprised of elements whose atoms are of the approximate size of the iron atom. Even a very small percentage of boron of the order of 0.005% appears to fill an astonishingly large proportion of the boundary vacancies with a resultant marked change in the precipitation hardening reaction in the vicinity of these boundaries. Accordingly, the presence of small but critical amounts of boron in austenitic iron-nickel-chromium-molybdenum or tungsten alloys, containing titanium, and with or without aluminum as precipitation hardening elements, will result in a remarkable improvement in the properties. Higher proportions of titanium in particular can be employed in these alloys with a marked increase in strength properties along with a surprising amount of ductility. The notch sensitivity and fatigue strength of the alloys are also greatly improved by the presence of boron therein. Consequently, an entirely new field of high strength alloys has been produced by employing critical amounts of boron in austenitic iron-nickel-chromium precipitation hardenable alloys.

While small amounts of boron produce such beneficial results, boron in amounts of in excess of 0.1% of the weight of the alloy results in a degradation of the properties of the austenitic alloys, the extent of impairment increasing with increasing boron content. In particular, the presence of boron above 0.1% limit causes formation of substantial amounts of borides which tend to agglomerate as stringers in a direction paralleling metal flow occurring during the working of alloy members. The borides are extremely brittle, with low ductility and give rise to microcracks and other defects. The ultrasonic quality of a member is adversely affected when large amounts of borides are present.

The borides tend to form a pronounced segregated second phase whereby with increasing boride content above a certain point, the ductility as determined by room temperature tensile tests in a direction transverse to the boride stringers drops pronouncedly so that at 0.1% B and higher the ductility is below commercially acceptable values.

Present commercial standards for acceptable ductility values require that the room temperature tensile test ductility in a transverse test specimen (i.e., the specimen is along a direction transverse to the metal flow) should be at least 5% and not less than half of the ductility of a parallel test specimen (i.e., the length of the test specimen is parallel to the metal flow), providing, of course, that the ductility of the longitudinal specimen is good or well above minimum acceptable ductility values. The ductility is determined by the percent elongation on a room temperature tensile test, though reduction of area is considered significant if it differs substantially from elongation values. A minimum elongation of 5% is ordinarily called for and will be acceptable, though in practice, elongations of at above 8%, and preferably above 10%, are desired.

In jet engine disks, for instance, these room temperature ductilities are critical since metal flow lines are often transverse to the applied stresses during engine operation, and the disks will be at a relatively low temperature.

The object of this invention is to provide an improved precipitation hardened austenitic alloy of iron, nickel and chromium containing at least one precipitation hardening component from the group consisting of titanium, and/or aluminum, by incorporating critical amounts of boron therein.

Another object of the invention is to provide for austenitic precipitation hardened alloys of iron, nickel, chromium and molybdenum containing predetermined amounts of boron and higher proportions of titanium than have been previously possible while maintaining a high acceptable ductility in the alloy.

A still further object of the invention is to provide an austenitic precipitation hardened iron base alloy comprising essentially from 20 to 28% nickel, 7% to 23% chromium, from 0.5% to 6% molybdenum or tungsten, from 1.6% to 3.5% by weight of titanium as the precipitation hardening agent, from 0.005% to 0.08% by weight of boron, the boron functioning to enable the titanium to be optimally distributed in the alloy, the boron being present in an amount which will not result in a boride phase which reduces the room temperature ductility of the alloy on parallel and transverse tensile tests below acceptable limits.

Other objects of the invention will in part be obvious and will in part appear hereinafter.

For a better understanding of the nature and objects of the invention, reference should be had to the following detailed description and drawings in which:

FIGS. 7, 8, 9, 10, 11 and 12 are photomicrographs of alloy members with varying proportions of boron, both in the solution treated, and solution treated and aged condition.

Figure 1:
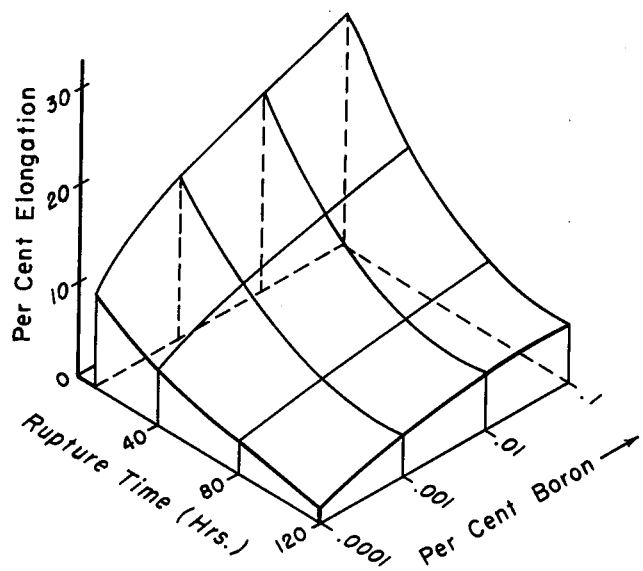
FIG. 1 is a tri-axial graph plotting the rupture time against elongation for the austenitic alloys containing varying amounts of boron.

In accordance with the present invention, greatly improved precipitation hardenable iron-nickel-chromium-molybdenum alloys are prepared by incorporating from 0.005% to 0.08% by weight of boron. The austenitic alloys with which the boron cooperates to great advantage comprise broadly from 20% to 28% nickel, from 7% to 23% chromium, up to 2.5% manganese, up to 1.5% silicon, from 0.5% to 6% of at least one metal from the group consisting of tungsten and molybdenum, up to 0.5% vanadium, up to 0.4% aluminum, from 1.6% to 3.5% titanium, less than 0.1% carbon, and the balance being iron except for incidental impurities.

Particularly satisfactory results have been obtained from alloys containing 24% to 28% nickel, 10% to 18% chromium, from 0.5% to 2% manganese, from 0.1% to 1% silicon, from 1.25% to 3.5% molybdenum, from 2.2% to 2.8% titanium, up to 0.4% aluminum, up to 0.5% vanadium, and from 0.005% to 0.05% boron, the balance being iron. Both laboratory and commercial sized heats made from the alloy in this range of proportions have proven to be exceptionally satisfactory. For certain wrought members this composition may be varied slightly so that the titanium will range from 2% to 3% and the boron from 0.006% to 0.08%.

Alloys of the highest creep-rupture properties and good ductility will comprise from 24% to 28% nickel, from 10% to 18% chromium, from 0.5 to 2% manganese, from 0.1% to 1% silicon, from 1.25% to 3.5% molybdenum, from 2.8% to 3.5% titanium, up to 0.4% aluminum, up to 0.5% vanadium, and from 0.01% to 0.08% boron, the balance being iron and small amounts of incidental impurities.

Cobalt may be present in the alloy up to 20% by weight to further increase its physical properties. The cobalt can replace the nickel or nickel and iron. Normally small amounts of cobalt are present in the nickel which is one of the main constituents of the alloy. However, the cobalt is not necessary and constitutes a costly component which ordinarily will not be desired.

The aluminum is present in solid solution and appears to function somewhat as a hardening agent along with the titanium. Care should be taken to assure that the aluminum is present as the metal and not as the oxide. Aluminum oxide constitutes an undesirable impurity inclusion.

The manganese is present in the alloy to function not only as a scavenger but as an essential alloying component which enables improved hot working properties along with improvement in overall physical properties. The silicon functions primarily as a scavenger.

The molybdenum and tungsten are essentially interchangeable components, but owing to the higher density of tungsten, twice as much by weight of tungsten is required to produce the same result as a given weight of molybdenum. Ordinarily the molybdenum will be preferred as the alloying component. The molybdenum, or tungsten, or both, not only improve the yield strength, hardness and other mechanical properties of the alloy but also function to produce better thermal properties.

The alloy should contain at least 0.005% by weight of boron. Amounts of boron greater than 0.005% and up to 0.08% result in improved characteristics of the alloys. The boron should be present in the larger amount when titanium is present in the higher proportions. Thus for alloys containing from 2.0% to 2.8% titanium, the boron content preferably is from 0.03% to 0.05%, while in alloys having up to 3.5% titanium, from 0.01% to 0.05% boron is preferred. These amounts of boron greatly improve the inherent ductility of the alloys. Our tests indicate that the boron optimally distributes the precipitated titanium compounds in the hardened alloys.

The function of boron in these alloys is based on the proportions thereof and different effects begin to exhibit themselves as increasing proportions of boron are present. Broadly four effects due to boron have been observed, approximately in accordance with the amounts indicated:

(1) Below 0.005% and down to about 0.001%, the boron prevents lamellar precipitates from developing during prolonged aging. Such lamellar precipitates causes moderate reductions in physical properties particularly if over 80% of lamellar precipitate is present.

(2) From about 0.005% to 0.01% boron prevents continuous grain boundary precipitates in titanium precipitation hardened alloys, the tendency to produce such continuous grain boundary precipitates increasing rapidly with increases of titanium above 2%.

(3) When boron is present in amounts of from 0.01 to 0.05 to 0.08%, small amounts of randomly dispersed boride components form. These borides give rise to a fine grain structure in the solution treated and aged alloys by nucleation phenomena and are the reason that titanium in amounts of well above 2% and up to 3.5% may be present in the austenitic alloys without causing adverse ductility and notch sensitive properties to occur.

(4) Above 0.08% of boron in the alloy the proportion of borides is in excess of any reasonable permissible amount. The borides now form a pronounced second phase appearing as stringers following the metal flow lines, the stringers form more definite brittle planes of weakness as the proportions increase above 0.1%.

Titanium is one of the more critical components of the alloy. In combination with boron, alloys containing 2.2% to 2.8% titanium are outstanding. While amounts of titanium of less than 1.9% in the austenitic alloy exhibit a sufficiently pronounced precipitation hardening effect concurrent with good ductility, the presence of boron in amounts of from 0.005% to 0.01% when the titanium content is from 1.6% to 1.9%, results in significant benefits though not as marked as when a higher titanium content is present.

With higher proportions of titanium, that is, above 2%, the boron cooperates therewith to produce a considerable and marked improvement in overall properties, and particularly stress-rupture properties. Thus, for a given iron-nickel-chromium-molybdenum alloy in the range of proportions given above, containing 1.7% titanium and no boron, the rupture time in hours at 1200° F. at 60,000 p.s.i. is 30 hours and an 8% elongation is obtained. The same alloy with 0.007% boron at 60,000 p.s.i. at 1200° F. has a stress rupture time of 53 hours and an 18% elongation. Additional amounts of boron of up to 0.12% do not change appreciably the rupture time or the rupture elongation properties beyond those obtained with 0.007% boron. However, above 0.08% boron the room temperature ductility on the transverse test specimen will be low. By comparison, a given iron-nickel-chromium-molybdenum alloy in the range of proportions given above, with 2.5% titanium and no boron, when tested at 60,000 p.s.i. at 1200° F. ruptured in 56 hours with 1.7% rupture elongation. This alloy was highly notch sensitive. Adding as little as 0.006% boron to this last alloy resulted in a surprising improvement in its overall properties. At 60,000 p.s.i. load at 1200° F. the specimens lasted 340 hours before rupturing and the rupture elongation was 3.7%. Similar improved stress rupture properties with high ductility above 5% and good room temperature ductility, in both the transverse and longitudinal directions will be obtained with boron contents of from 0.01% to 0.05%. With 0.12% boron under the same test conditions, members of the alloy withstood 235 hours and had an elongation of 7.8%. In addition the alloy with 0.12% boron was not notch sensitive. With increasing amounts of titanium and up to 3.3%, as little as 0.007% by weight of boron resulted in an alloy which withstood a load of 60,000 p.s.i. for 503 hours and the elongation was 2.3%. Amounts of boron of the order approaching 0.1% for example, 0.03 to 0.08%, in the austenitic alloy containing from 3% to 3½% titanium resulted in members that would withstand over 500 hours while loaded at 60,000 p.s.i. at 1200° F. The rupture elongation was over 3% for alloys containing titanium in amounts of from 3% to 3½%.

Vanadium is present in our alloys either as brought in normally by the alloy components, i.e., of the order of 0.1%, or additional amounts of vanadium up to 0.5% may be added to function as a scavenger and alloying component.

It will be appreciated that small quantities of phosphorus, sulfur, oxygen, nitrogen, and other unavoidably or inadvertently present elements may be present in the alloys without detrimental results.

The alloy of the present invention may be readily prepared by melting a relatively pure grade of iron, nickel, chromium, molybdenum and the other components of the alloy either in an induction furnace or in a vacuum furnace either arc or induction operated. One procedure is initially to melt a mixture of the iron, nickel and molybdenum components. A deoxidizer such as a calcium-silicon alloy is added to the melt. The melt may be protected, if in an open air induction furnace, by applying an inert or refining slag coating of low melting point. Thereafter, ferro-chromium and ferro-titanium, or pure chromium and pure titanium, or other suitable alloys thereof, may be added in the desired proportions along with the manganese, vanadium, and aluminum components. The melt should be thoroughly stirred, if possible by electro-magnetic coils, to assure a thorough and uniform combination of all the components of the melt. Shortly before the melt is to be poured, the desired amount of ferro-boron is added. The melt is stirred and may then be teemed into ingots.

In order to produce members such as rotor disks for jet engines or gas turbines, the ingots can be forged or wrought after heating them to a temperature of between 1550° F. and 2200° F. The ingots are subjected to heavy working to assure thorough breakdown of the cast ingot structure. It may be necessary to reheat the ingot several times in order to work it to desired shape and size. In some instances, members may be cast, for instance, by precision casting or shell molding procedures, from the melt without it being necessary to forge or otherwise hot work the metal to shape. The cast members may be ground or machined to desired dimensions and shape. Care should be taken that the castings are not permitted to solidify into an excessively coarse grain structure. It will be appreciated that hot worked members will have a superior fiber structure, and will be substantially better in grain structure and, consequently, will be superior in strength and ductility to cast members.

The wrought or cast members are subjected to a solution heat treatment to remove strains or work hardening and to recrystallize the alloy to a substantially uniform fine grain and to cause the precipitation hardening components to go into solution. A preferred solution treatment is to maintain the alloy members at a temperature of between 1800° F. to 2200° F. for a period of time of at least one-half hour. In some instances the heat treated members may be quenched in a suitable fluid medium such as oil or water, or even air cooled. The solution treated members are subjected to a precipitation hardening aging treatment at a temperature of from 1100° F. to 1450° F. for a period of time to produce a high degree of hardness. Solution treatment should be carried out in an inert or non-oxidizing atmosphere. Ordinarily it is desirable to carry out the aging treatment on a given alloy member until the maximum hardness obtainable for that given alloy composition has been attained. Examples of suitable aging heat treatments are the following:

TYPE A

Heat for 20 hours at 1350° F. Cool to 1200° F. in 5 hours and hold for 20 hours at 1200° F. Finally air cool to room temperature.

TYPE B

Heat for 8 hours at 1350° F. Cool to 1200° F. in 5 hours and hold at 1200 ° F. for 30 hours. Air cool to room temperature.

TYPE C

Heat for 10 hours at 1200° F., then heat to 1350° F. in 3 hours and hold at 1350° F. for 5 hours. Air cool to room temperature.

TYPE D

Heat at 1200° F. for 16 hours, then slowly increase the temperature over a period of 16 hours to 1300° F. and hold at 1300° F. for 12 hours, and finally air cool to room temperature.

The aging treatment generally comprises holding the solution treated members at a temperature of from 1150°

F. to 1400° F. for at least 10 hours, and preferably about 20 hours and more. It will be noted that the above heat treatments comprise either (1) an initial heating at a temperature of from 1300° F. to 1400° F. for a period of up to 20 hours followed by a slow cooling to approximately 1200° F. over a period of 5 hours, and then holding for at least 20 hours at the latter temperature, or (2) holding the members for up to 16 hours at about 1200° F. followed by a slow increase in temperature to from 1300° F. to 1350° F. and holding at the latter temperature for as long as 12 hours.

From a considerable number of tests, it has been established that there is a relationship between the boron content, the rupture time and elongation for the alloys of the present invention. It will be understood that as the load applied to test members is varied it will cause failure in different rupture test times. The results of tests showing such correlation are shown in FIG. 1 of the drawings. It will be noted that there is a very marked increase in elongation for any rupture time (or the load) when the boron content of the alloy is increased. The optimum elongation is obtained with increasing boron contents of up to about 0.1%. It will be noted that at approximately 0.005% of boron an elongation in excess of 5% or more is obtained for any of the alloys under any of the given rupture times or loads. Since it is felt desirable in most high temperature applications such as jet engine disks that the ductility correspond to about 5% elongation as a minimum to insure that the alloy be notch insensitive, the presence of approximately 0.005% of boron is necessary. For many purposes an elongation of as low as 3% is acceptable as long as the alloy remains notch insensitive. It will be understood that simply adding this amount of boron will not result in the desired degree of elongation unless other controlling factors are maintained to assure optimum quality of members. For example, this requires due care to obtain the optimum melting, fabricating and heat treating schedule for any given alloy.

The data of FIGURE 1 must be qualified by the fact that adequate room temperature ductility as determined from tensile tests on specimens cut parallel to and transverse to the metal flow lines must be present. Consequently, the upper limit for boron is 0.08% in the alloys in order to secure good room temperature ductility on transverse test specimens. At the elevated temperatures for the rupture tests, the ductility in all directions is not markedly affected by the presence of boride stringers.

Figure 2:
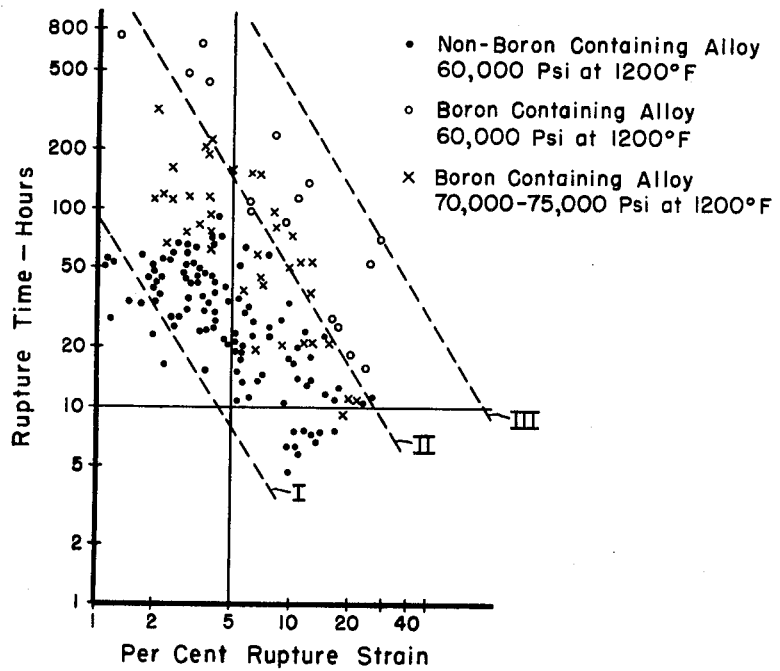
FIG. 2 and FIG. 3 are point and line graphs plotting the rupture time against rupture strain and stress, respectively, for a number of austenitic alloys.

Referring to FIG. 2 of the drawings, there is illustrated a plot of a considerable number of heats of alloys of essentially the same composition with variations primarily in the titanium and boron content. These alloys all had the following nominal composition in weight percent:

| | Percent |
|---|---|
| Nickel | 26 |
| Chromium | 13 |
| Molybdenum | 3 |
| Silicon | 1 |
| Manganese | 1.3 |
| Iron | 52 to 55 |

The aluminum, vanadium and carbon were within the proportions given previously. These compositions were prepared with from 1.6% to 3% titanium and boron in amounts of from 0.001% to 0.1%, many samples containing from 0.005% to 0.05% boron. The alloy members corresponding to the solid circles did not exceed approximately 2% titanium and contained not in excess of approximately 0.001% boron.

The alloys of FIG. 2 were processed by forging ingots at 2000° F. Samples of the forged members were solution treated for one hour at temperatures of up to 1950° F. and quenched in oil. Aging treatments Types A and B were applied to the first group of alloys represented by the solid circles. It will be noted that nearly all of the solid circles were within the dashed lines I and II.

The tests corresponding to the open circles (o) and crosses (x) were from alloys comprising from 2% to 3% of titanium, and boron in amounts of at least 0.005%, the amount of boron increasing with increased titanium content to as much as 0.1%. These samples were prepared from 21 separate 50 pound experimental heats produced in an induction furnace. Ingots of the alloys were forged into ⅝ inch diameter bar stock, cut to length, solution treated one hour at 1950° C., quenched in oil and four lots thereof were aged using each of the four aging treatments described previously under Types A, B, C and D. The samples represented by the open circles were tested at 60,000 p.s.i. at 1200° F., while the samples represented by the crosses were tested at 70,000 and 75,000 p.s.i. at 1200° F. It will be noted that even at the 70,000 and 75,000 p.s.i. loads, the average of the boron containing samples was well above the average of the samples containing substantially no boron which were loaded to 60,000 p.s.i. Even at 60,000 p.s.i. loads every sample of the boron containing alloy exceeded the best alloy member containing no boron. The dispersion of the points was toward line III of FIG. 2.

Figure 3:
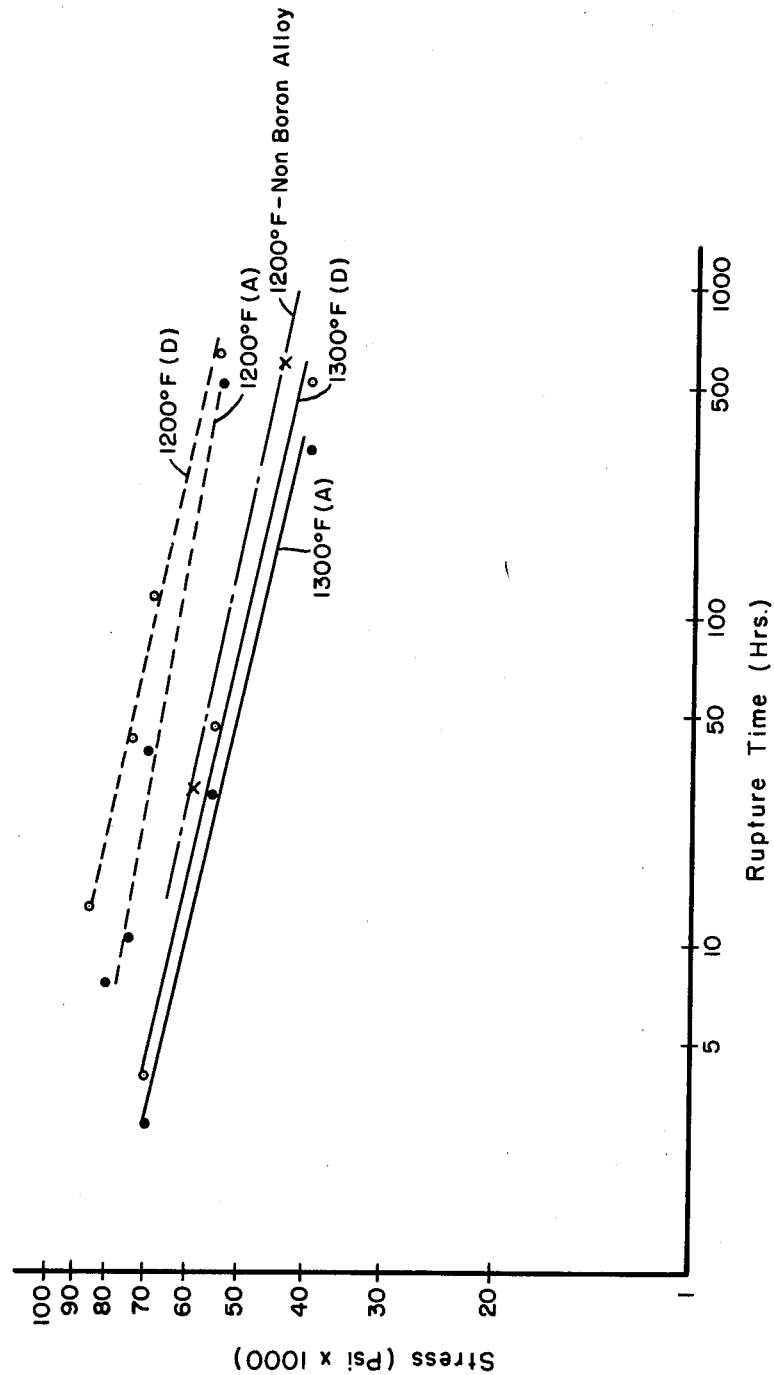

FIG. 3 comprises curves of rupture time at various stresses determined for the alloys of the present invention. The solid line and the dashed line curves were derived from tests made on alloys composed of from 24% to 28% nickel, from 10% to 18% chromium, from 0.5% to 2% manganese, from 0.1% to 1% silicon, from 1.25% to 3.5% molybdenum, from 2.2% to 2.8% titanium, from 0.03% to 0.15% boron, the balance being iron, and small amounts of incidental components such as vanadium, aluminum and the like. The solid line curves represent tests conducted at 1300° F., while the dashed line curves represent tests conducted at 1200° F. The aging treatments Type A and D were employed as indicated. For comparison purposes FIG. 3 includes a dot-dash line curve of standard rupture stress-rupture time representing tests made on a widely used, closely similar alloy differing from the alloys of this invention primarily in that it contained no boron (i.e., less than 0.001%) and the titanium content was from 1.7% to 1.9%. It will be understood that the titanium content in this previous alloy was the highest that could be permitted in order to maintain ductility.

The tests embodied in FIGS. 2 and 3, and other tests, have established that the boron containing alloys of the present invention can be employed at temperatures of 1200° F. at a load of up to 25% greater than that previously possible for essentially similar alloy without boron while maintaining a high ductility in terms of elongation. Further creep-rupture tests have indicated that at a given stress the boron containing alloys of the present invention can be employed at a temperature of approximately 100° F. higher than the same alloys without boron at any given temperature in the range of 1100° F. to 1250° F.

The strength properties were determined for several alloys. In one case, a number of specimens from an alloy of the following composition were prepared:

| | Percent |
|---|---|
| Nickel | 26.2 |
| Chromium | 12.9 |
| Iron | 53.0 |
| Silicon | 0.95 |
| Manganese | 1.25 |
| Molybdenum | 2.98 |
| Carbon | 0.02 |
| Nitrogen | 0.005 |
| Titanium | 2.5 |
| Boron | 0.13 |

The balance was incidental impurities. The melts were cast into ingots which were processed by forging at 2000° F. to ⅝ inch diameter bar stock. The forged bars were solution treated for one hour at 1950° F. and quenched in oil. A part of the bars was subjected to the Type A aging treatment while the remainder were subjected to the Type D aging treatment. These bars were subjected to tensile tests in which the ultimate and the yield strength were obtained. The results are plotted in FIG. 4 of the drawings as the dashed curves. By comparison, a substantially similar alloy containing 1.85% titanium and no boron was subjected to similar tests. The elongation of both sets of bars was well above 10%. The results of the yield strength and ultimate strength are plotted as the solid curves in FIG. 4 of the drawings. It will be observed that there is a substantially constant difference of an excess of 25,000 pounds/sq. in. between the yield strength of the two alloys in favor of the higher titanium and boron containing alloy over the entire range of temperatures of up to 1350° F. The ultimate strength difference is of the order of 15,000 pounds at room temperature and increases to approximately 25,000 pounds at 1200° F., being higher for the boron containing alloy.

Figure 4:
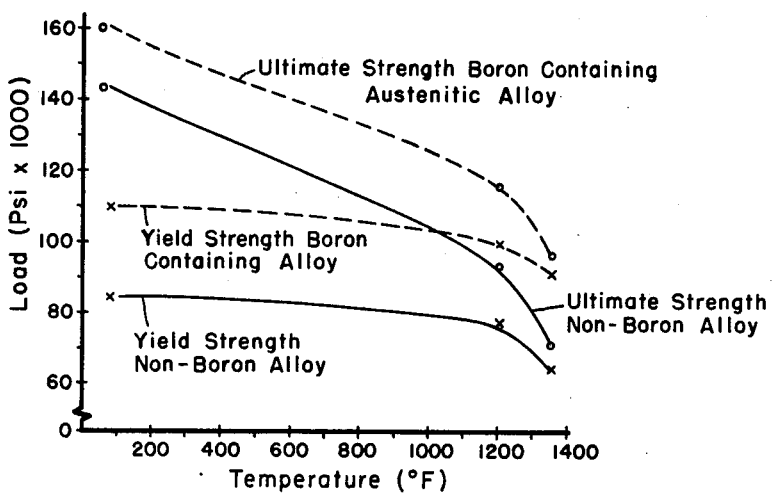
FIG. 4 is a graph plotting tensile and yield strength of the austenitic alloys, with and without boron over a range of temperatures.
Figure 5:
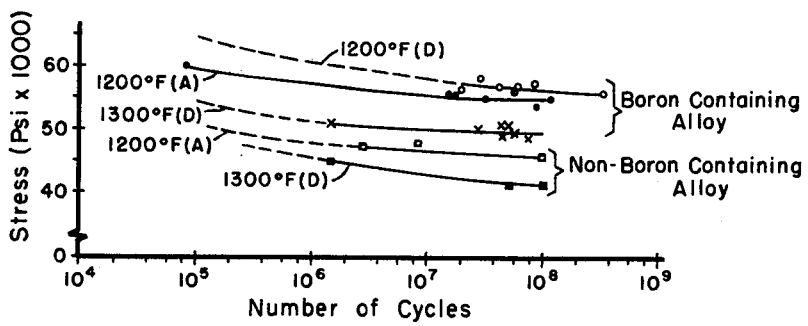
FIG. 5 is a graph plotting fatigue strength of the austenitic precipitation hardened alloys, with and without boron, setting forth the number of cycles at varying stresses.

FIG. 5 comprises the fatigue curves for the alloys employed in the tests shown in FIG. 4. As evident therefrom the boron containing alloys of the present invention were greatly superior to the alloys without boron throughout the entire series of tests. The fatigue strength in general is approximately 20% greater for the boron containing alloys.

In order to illustrate the improvement in notched bar strength obtainable by the alloys of the present invention, a series of alloys were prepared as follows:

such configuration that the notched bar stress concentration ratio was approximately 3.9.

Table II

| Specimen Number [1] | Plain Bar | | | Notched Bar | |
|---|---|---|---|---|---|
| | Hours to Rupture | Elongation, Percent | Hardness R₀ before/after | Hours to Rupture | Hardness R₀ before/after |
| 752A | 38 | 3.5 | 34/34 | 16.0 | 34/34 |
| 587A | 32 | 6.0 | 31/31 | 35.0 | 32/32 |
| 545A | 25 | 18.1 | 31/31 | 56.0 | 31/31 |
| 752D | 93 | 1.6 | 32/35 | 5.7 | 34/35 |
| 587D | 95 | 2.9 | 32/35 | 44.0 | 31/36 |
| 545D | 95 | 8.5 | 31/35 | 156.0 | 31/36 |

[1] Letter after specimen number refers to type of aging treatment.

While heat No. 545 performed well on the creep rupture tests, due to a .12% boron content it had an excess of boride precipitate and as a result the room temperature tests would indicate an inadequate ductility in transverse test specimens.

Figure 6:
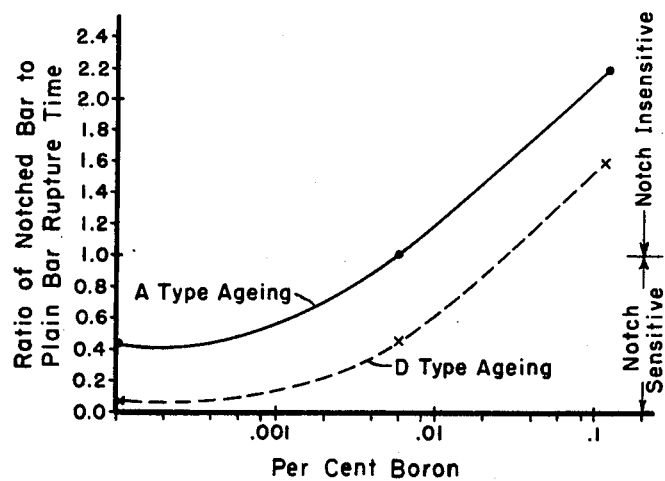
FIG. 6 is a graph plotting the ratio of notched bar to plain bar rupture time for the austenitic precipitation hardened alloys containing varying amounts of boron.

The curves plotted in FIG. 6 show the ratio of notch bar to plain bar rupture time plotted against boron content for the bars produced from the alloys of Table I. It will be noted that the increase in boron content definitely improved the notch insensitivity for the alloys regardless of the heat treatment. When the ratio exceeds 1, the members are not notch sensitive. Members subjected to aging treatment Type A exhibited no notch sensitivity when boron exceeded approximately 0.006%, whereas heat treatment Type D required approximately 0.03% boron in the alloy to eliminate the notch sensitivity.

A series of four heats was prepared having the following general alloy composition:

| | Percent |
|---|---|
| Nickel | 26 to 27 |
| Chromium | 14.5 |
| Molybdenum | 1.5 |
| Silicon | 0.4 |
| Carbon | 0.03 |
| Manganese | 1 |
| Vanadium | About 0.1 |
| Iron | Balance |

Table I

| Heat No. | C | Si | Mn | Ni | Cr | Mo | N | Ti | B | Fe |
|---|---|---|---|---|---|---|---|---|---|---|
| 752 | .020 | 0.92 | 1.39 | 28.0 | 12.6 | 3.09 | | 2.4 | .000 | 51.1 |
| 587 | .016 | 1.05 | 1.31 | 26.3 | 13.0 | 3.17 | .006 | 2.5 | .006 | 52.1 |
| 545 | .019 | 1.01 | 1.33 | 26.1 | 13.1 | 3.13 | .006 | 2.4 | .120 | 52.4 |

Ingots of the alloys from each of the heats were processed by forging at 2000° F. to ⅝ inch diameter bar stock. The bars were solution treated for one hour at 1950° F. and quenched in oil. The forging and solution heat treating developed a grain size of No. 4 to 5 ASTM. Heat treatments A and D were applied to portions of these solution treated bars. The bars were tested at 1200° F. at 70,000 p.s.i. load both as plain bars and standard notch bars. The results of these tests are set forth in Table II. The tests were applied to members having a notch of The boron and titanium content of the four heats was varied as follows:

| Heat | Titanium, Percent | Boron, Percent |
|---|---|---|
| A | 3.3 | 0.11 |
| B | 2.95 | 0.08 |
| C | 2.75 | 0.062 |
| D | 3.0 | 0.025 |

The ingots from the four heats were forged into disks and test specimens were cut in a direction parallel (P) and transverse (T) to the flow of metal during forging. On room temperature tensile tests the following results were obtained.

Table III

| Specimen | | Percent Boron | 0.2% Yield Strength, p.s.i. | Ult. Strength, p.s.i. | Elongation, Percent | Reduction of Area, Percent |
|---|---|---|---|---|---|---|
| A | P | 0.11 | 142,000 | 186,000 | 19 | 21 |
| | T | 0.11 | 134,000 | 139,000 | 2 | 3 |
| B | P | 0.08 | 131,000 | 168,000 | 16 | 18 |
| | T | 0.08 | 134,000 | 150,000 | 6 | 10 |
| C | P | 0.062 | 125,000 | 168,000 | 19 | 25 |
| | T | 0.062 | 124,000 | 148,000 | 6 | 10 |
| D | P | 0.025 | 130,000 | 172,000 | 17 | 18 |
| | T | 0.025 | 137,000 | 175,000 | 18 | 22 |

A series of heats was prepared from a master alloy having the nominal composition 26.0% nickel, 13.0% chromium, 1.5% molybdenum, 2.8% titanium, balance iron. The heats varied only in the amount of boron present. Boron-10 was added to each heat as follows: Heat No. 1 contained 0.002%, heat No. 2 contained 0.022% and heat No. 3 contained 0.082% boron. The heats were cast into ingots and rolled at 2100° F. into ⅜ inch diameter bars. The bars were solution treated one hour at 2000° F. and water quenched. Several of the solution treated bars in each heat were then precipitation hardened by heating at 1375° F. for 20 hours, cooled to 1200° F. and held for 20 hours and then air cooled.

Metallographic samples were prepared from the bars of each heat, both solution treated and precipitation hardened, and the samples were polished and etched. Upon the polished and etched surfaces, strips of alpha sensitive autoradiographic film were placed. The samples were encapsulated in aluminum tubes and the assembly placed in the core of a nuclear test reactor and irradiated to $2 \times 10^{10} nvt$. The tubes were then opened, the film strip was left in place and developed. Optical photomicrographs at a magnification of 750 (reduced 45%) were taken of the films and are shown in FIGS. 7 to 12. The boron-10 under radiation gave off alpha radiation which resulted in a characteristic crows-foot pattern, particularly evident in FIGURES 11 and 12. The boron, if in excess of its solid solubility in the alloy, about 0.005%, formed a boride second phase. This boride phase is evident as a few more or less randomly scattered particles 10 in FIGURES 9 and 10, and a more dense stringer-like distribution 12 of particles 10 in FIGURES 11 and 12. No boride particles are present in FIGURES 7 and 8. Conventional photomicrographs show the boride particles of essentially the same size and in the distribution indicated in the autoradiographs.

The alloys of the present invention have proven to be exceptionally satisfactory when cast into ingots of commercial size of the order of 3,000 to 10,000 pounds. Thus, an alloy ingot weighing 3500 pounds was prepared from a composition in this range of proportions with approximately 2.7% titanium and 0.05% boron. Disks were forged from the ingot, and after solution treating and aging stress rupture tests on specimens from the disks gave the following results:

*Table IV*

| Temp., °F. | Stress, p.s.i. | Hours to Rupture | Rupture, Percent Elongation |
| --- | --- | --- | --- |
| 1,200 | 70,000 | 98.4 | 6.6 |
| 1,300 | 60,000 | 143.3 | 5.2 |

This alloy exhibited excellent room temperature ductility on parallel and transverse test specimens.

It will be understood that the description and drawings are only illustrative.

We claim as our invention:

1. A precipitation hardenable austenitic alloy having a high rupture strength at temperatures of from 1100° F. to 1300° F. and being notch insensitive, consisting essentially of from 24% to 28% by weight of nickel, from 10% to 18% chromium, up to 2.0% manganese, up to 1% silicon, from 1.25% to 3.5% molybdenum, from 2.2% to 2.8% titanium, less than 0.1% carbon, up to 0.5% vanadium, and from 0.005% to about 0.05% boron, up to 0.4% aluminum, and the balance being iron, the boron functioning to improve the properties of the alloy on precipitation hardening treatment by optimally distributing the hardening precipitate therein.

2. A precipitation hardenable austenitic alloy having a high rupture strength at temperatures of from 1100° F. to 1300° F. and being notch insensitive, consisting essentially of from 24% to 28% by weight of nickel, from 10% to 18% chromium, from 0.3% to 2.0% manganese, from 0.1% to 1% silicon, from 1.25% to 3.5% of at least one metal selected from the group consisting of tungsten and molybdenum, from 2.2% to 2.8% titanium, less than 0.1% carbon, up to 0.5% vanadium, and from 0.005% to about 0.05% boron, up to 0.4% aluminum, and the balance being iron, the boron functioning to improve the properties of the alloy on precipitation hardening treatment by optimally distributing the hardening precipitate therein.

3. A member comprising a precipitation hardened alloy consisting essentially of from 24% to 28% by weight of nickel, from 10% to 18% chromium, from 0.5% to 2.0% manganese, from 0.1% to 1% silicon, from 1.25% to 3.5% molybdenum, from 2.2% to 2.8% titanium, less than 0.1% carbon, up to 0.5% vanadium, and from 0.005% to about 0.05% boron, up to 0.4% aluminum, and the balance being iron except for incidental impurities, the alloy being substantially completely recrystallized.

4. A member comprising a precipitation hardened alloy consisting essentially of from 24% to 28% by weight of nickel, from 10% to 18% chromium, from 0.5% to 2.0% manganese, from 0.1% to 1% silicon, from 0.5% to 3.5% of at least one metal selected from the group consisting of tungsten and molybdenum, from 2.0% to 3.0% titanium, less than 0.1% carbon, up to 0.5% vanadium, and from 0.006% to not more than 0.08% boron, up to 0.4% aluminum, and the balance being iron except for incidental impurities, the alloy being substantially completely recrystallized.

5. A wrought disk comprising a precipitation hardened alloy consisting essentially of from 24% to 28% by weight of nickel, from 10% to 18% chromium, from 0.3% to 2.0% manganese, from 0.1% to 1% silicon, from 1.25% to 3.5% of at least one metal selected from the group consisting of tungsten and molybdenum, from 2.0% to 3.0% titanium, less than 0.1% carbon, up to 0.5% vanadium, and from 0.006% to about 0.05% boron, up to 0.4% aluminum, and the balance being iron except for incidental impurities, the alloy being substantially completely recrystallized.

6. In the process of producing an alloy member having improved stress-rupture properties at elevated temperatures, the steps comprising forging a body of an alloy consisting essentially of from 24% to 28% by weight of nickel, from 10% to 18% chromium, from 0.5% to 2.0% manganese, from 0.1% to 1% silicon, from 1.25% to 3.5% molybdenum, from 2.2% to 2.8 titanium, less than 0.1% carbon, up to 0.5% vanadium, and from 0.005% to 0.05% boron, up to 0.4% aluminum, and the balance being iron, solution heat treating the forged member at a temperature of from 1800° F. to 2200° F., aging the solution treated member at a temperature of from 1150° F. to 1450° F. for at least 10 hours to develop a high hardness and high strength, the boron functioning to improve the properties of the alloy on precipitation hardening treatment by optimally distributing the hardening precipitate therein and to render the alloy member notch insensitive.

7. In the process of producing an alloy member having improved stress-rupture properties at elevated temperatures of from 1100° F. to 1300° F., the steps comprising forging a body of an alloy consisting essentially of from 20% to 28% nickel, from 7% to 23% chromium, from 0.3% to 2.5% manganese, from 0.1% to 1.5% silicon, from 1% to 3.5% of at least one metal selected from the group consisting of tungsten and molybdenum, up to 0.5% vanadium, less than 0.1% carbon, up to 0.4% aluminum, from 2.0% to 3.5% titanium, from 0.005% to 0.08% boron and the balance being iron, except for incidental impurities, solution heat treating the forged members at a temperature of from 1800° F. to 2200° F., aging the solution treated member at a temperature of from 1150° F. to 1450° F. for at least 10 hours to develop a high hardness and a high strength and to render the alloy member notch insensitive.

8. A precipitation hardenable austenitic alloy having a high stress-rupture strength at temperatures of from 1100° F. to 1300° F. and being notch insensitive, consisting essentially of from 24% to 28% by weight of nickel, from 10% to 18% chromium, from 0.5% to 2.0% manganese, from 0.1% to 1% silicon, from 1% to 3.5% of at least one metal selected from the group consisting of tungsten and molybdenum, from 1.9% to 3.5% titanium, less than 0.1% carbon, up to 0.5% vanadium, from 0.006% to about 0.05% boron up to 0.4% aluminum and the balance being iron, the boron functioning to improve the properties of the alloy on precipitation hardening treatment by optimally distributing the hardening precipitate therein.

9. In the process of producing an alloy member having improved stress-rupture properties at elevated temperatures, the steps comprising forging a body of an alloy consisting essentially of from 24% to 28% by weight of nickel, from 10% to 18% chromium, from 0.5% to 2.0% manganese, from 0.1% to 1% silicon, from 1.25% to 3.5% molybdenum, from 2.2% to 3.5% titanium, less than 0.1% carbon, up to 0.5% vanadium, and from about 0.03% to 0.08% boron, up to 0.4% aluminum, and the balance being iron, solution heat treating the forged member at a temperature of from 1800° F. to 2200° F., aging the solution treated member at a temperature of from 1150° F. to 1450° F. for at least 10 hours to develop a high hardness and high strength, the boron functioning to improve the properties of the alloy on precipitation hardening treatment by optimally distributing the hardening precipitate therein and to render the alloy member notch insensitive.

10. A precipitation hardenable austenitic alloy having a high rupture strength at temperatures of from 1100° F. to 1300° F. and being notch insensitive, consisting essentially of from 24% to 28% by weight of nickel, from 10% to 18% chromium, from about 0.3% to 2.5% manganese, up to 1% silicon, from 1.0% to 3.5% molybdenum, from 2.2% to 2.8 titanium, less than 0.1% carbon, up to 0.5% vanadium, about 0.05% boron, up to 0.4% aluminum, and the balance being iron, the boron functioning to improve the properties of the alloy on precipitation hardening treatment by optimally distributing the hardening precipitate therein.

11. A precipitation hardenable austenitic alloy having a high rupture strength at temperatures of from 1100° F. to 1300° F. and being notch insensitive, consisting essentially of about 26% nickel, about 13% chromium, about 3% molybdenum, about 1% silicon, about 1.3% manganese, less than 0.1% carbon, up to 0.5% vanadium, up to 0.4% aluminum, from 2% to 3% of titanium and from 0.005% to 0.1% boron, and balance iron except for incidental impurities, the boron functioning to improve the properties of the alloy or precipitation hardening treatment by optimally distributing the hardening precipitate therein.

12. A precipitation hardenable austenitic alloy having a high rupture strength at temperatures of from 1100° F. to 1300° F. and being notch insensitive, consisting essentially of from 24% to 28% nickel, from 10% to 18% chromium, from 0.5% to 3.5% molybdenum, up to 2% manganese, up to 1% silicon, less than 0.1% carbon, up to 0.5% vanadium, up to 0.4% aluminum, about 2.7% titanium, about 0.05% boron, and the balance iron except for incidental impurities, the boron functioning to improve the properties of the alloy on precipitation hardening treatment by optimally distributing the hardening precipitate therein.

References Cited by the Examiner

UNITED STATES PATENTS 3,065,067 11/62 Aggen _____ 75—128.9
3,065,068 11/62 Dyracz et al. _____ 75—124

DAVID L. RECK, *Primary Examiner.*

Disclaimer 3,199,978.—*Jack T. Brown*, *Monroeville*, *Albert W. Hoppe*, Canonsburg, and *Donald W. Gunther*, Monroeville, Pa. HIGH-STRENGTH, PRECIPITATION HARDENING AUSTENITIC ALLOYS. Patent dated Aug. 10, 1965. Disclaimer filed Feb. 6, 1970, by the assignee, *Westinghouse Electric Corporation*.

Hereby enters this disclaimer to claim 11 of said patent.

[*Official Gazette June 2, 1970.*]